3,041,269
HIGH DENSITY CATALYST, METHOD FOR PREPARING THE SAME, AND USE OF SAID CATALYST COMPOSITE IN THE CRACKING OF HYDROCARBONS
Conroy D. Andersen and Robert H. Cramer, Woodbury, N.J., assignors to Socony Mobil Oil Company, Inc., a corporation of New York
No Drawing. Filed Feb. 15, 1960, Ser. No. 8,496
12 Claims. (Cl. 208—120)

This invention relates to an improved cracking catalyst characterized by an unusually effective combination of physical attributes; specifically by a high resistance to attrition, high stability to deactivation by steam, high density and high diffusivity. In one embodiment, the invention is directed to an improved method for preparing composites of such characteristics useful in catalytic cracking of heavy petroleum fractions to lighter materials boiling in the gasoline range. In another embodiment, the invention is concerned with catalytic cracking of hydrocarbon oils in the presence of the aforesaid catalyst.

As is well known, there are numerous materials, both of natural and synthetic origin, which have the ability to catalyze the cracking of hydrocarbons. However, the mere ability to catalyze cracking is far from sufficient to afford a catalyst of commercial significance. Of the presently commerically available cracking catalysts, a synthetic silica-alumina composite catalyst is by far the most widely used. While such type catalyst is superior in many ways to the earlier employed clay catalysts and is fairly satisfactory, it is generally lacking in one or more of the physical attributes desired in a present day cracking catalyst.

Thus, modern catalytic cracking processes require a catalyst which is not only specifically active in the chemical reactions which are to be catalyzed but also possesses physical characteristics required for commercially successful operation. One of the outstanding physical attributes of a commercial catalyst is hardness, i. e. the ability to resist attrition. The ability of a particle to hold its shape in withstanding the mechanical handling to which it is subjected upon storage, shipment, and use is a primary requirement for a successful cracking catalyst and for modern catalytic processes utilizing such catalyst. Thus, catalytic cracking operations in which heavy petroleum fractions are converted to lighter materials boiling in the range of gasoline are carried out in the presence of a solid porous catalyst and generally a composite of silica-alumina which may contain a minor proportion of one or more added metals or metal oxides. These catalytic processes are generally advantageously carried out employing methods wherein the catalyst or contact mass is subjected to continuous handling. In such operations, a continuously moving stream of hydrocarbon feed is contacted with a continuously moving stream of catalyst for the accomplishment of conversion and thereafter the catalytic material is continuously regenerated and returned to the conversion zone. This continuous handling and regeneration of the catalyst particles results in considerable breakage and constant abrasion, consuming the catalyst and giving rise to an excessive amount of fines which are a loss since they generally cannot be re-used in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard, porous cracking catalyst having the ability to withstand abrasion during the necessary handling involved during continual conversion and regeneration, is definitely desirable in overcoming the aforementioned disadvantages.

Another important physical property of solid porous cracking catalyst is the density thereof. Increasing the density of such catalysts results in increased seal-leg, vapor disengaging and carbon burning capacity in moving bed catalytic cracking units. Increasing catalyst density will therefore permit greater hydrocarbon throughput and catalyst circulation rates in existing units or, alternatively, afford handling of the same capacity in smaller cracking units.

Another physical property desirable in a cracking catalyst is steam stability, i. e. the ability not to become deactivited in the presence of steam at an excessively high rate. During the cracking operation, heavy carbonaceous materials commonly referred to as coke, deposit on the catalyst and prevent contact between the catalytic surface and the hydrocarbon charge. As a result of coke formation, it is necessary to regenerate the catalyst at frequent intervals, first by stripping out entrained oil by contacting with steam and then burning off the carbonaceous deposits by contacting with an oxygen-containing gas, such as air, at elevated temperatures. However, it has been found that the cracking activity of the catalyst deteriorates upon repeated use and regeneration and that silica-alumina catalysts are very sensitive to steaming. Since the catalyst ordinarily comes into contact with steam in the steam seal at the inlet of the reactor wherein cracking is accomplished and since steaming has been found to be the most effective way of removing entrained oil from the spent catalyst prior to thermal regeneration with air, it is apparent that catalyst characterized by good steam stability is definitely to be desired.

Still another important physical attribute of a modern-day cracking catalyst is its diffusivity. The diffusivity of a catalyst is a measured property which characterizes the ability of fluids to diffuse therethrough. A high catalyst diffusivity permits more rapid diffusion of hydrocarbon vapors and other gases throughout the catalyst structure, thereby making possible the use of higher space velocities of hydrocarbons and requiring less time for regeneration of the catalysts when they have become fouled with carbonaceous materials. In present commercial cracking units, carbon burning capacity of the regenerator is the primary limiting factor on conversion capacity for the unit and on conversion level per pass. It is accordingly highly desirable to increase carbon burning capacity by improving the carbon burning rate for the spent catalysts.

It has heretofore been reported that catalysts having one or another of the above characteristics individually have been prepared and tested for catalytic cracking. Such other catalysts, although they may be equal to the present catalyst in one respect or another, are less successful in other respects and are therefore inferior. Thus, while catalysts are known which may be equal in effectiveness to the catalyst of the present invention in any one given respect, none of them, as far as known, has combined the advantages found in the present catalyst.

The above specified characteristics of the catalyst described herein are achieved by specific control and adjustment of the various interdependent factors involved in production of the catalyst. In one embodiment, the present invention comprises a method for manufacturing an attrition resistant catalyst consisting essentially of silica, alumina and barium sulfate, highly stable to deactivation by steam, characterized by a high diffusivity and an apparent density of at least 0.9 gram/cc. by dispersing in a silica-alumina sol containing, on a dry basis, a major proportion of silica and a minor proportion of between about 5 and about 15 percent by weight of alumina, an amount corresponding to between about 30 and about 55 percent by weight of the resulting dry composite of finely divided barite (barium sulfate) which has a weight mean particle diameter of between about 1 and about 7 microns, the concentrations and proportions of reactants being such that the resulting silica-alumina sol having the finely divided barite dispersed therein has a pH of between 8 and 9 and a product concentration of between 10 and 20, permitting the resulting sol to set to a hydrogel, base-exchanging zeolitic alkali metal from the hydrogel, and thereafter washing the hydrogel free of water-soluble matter, drying and calcining.

Another embodiment of the invention affords a method for manufacturing a catalyst of the above-indicated characteristics by intimately contacting an aqueous acid solution of a water-soluble aluminum salt in which the equivalent ratio of hydrogen, derived from the acid, to aluminum, derived from the aluminum salt, is at least 0.21; an aqueous alkali metal silicate solution in which the weight ratio of alkali metal oxide to silica is at least 0.34 and an aqueous slurry of barite powder having a weight mean particle diameter of between about 1 and about 7 microns present in an amount corresponding to between about 30 and about 55 percent by weight of the resulting dry composite, under conditions such that the resulting silica-alumina hydrosol, having the powdered barite dispersed therein has a pH of between 8 and 9, a product concentration of between 10 and 20 and in which the content of alumina combined with silica in the silica-alumina hydrosol corresponds to between about 5 and about 15 percent by weight on a dry basis, permitting the resulting sol to set to a hydrogel, base-exchanging zeolitic alkali metal from the treated hydrogel, washing the hydrogel free of water-soluble matter, drying and calcining.

In another embodiment, the invention resides in a method for catalyst preparation, as above described, in which the hydrogel, after formation but prior to base-exchange is hydrothermally treated at a temperature of between about 70° F. and 200° F. for 4 to 24 hours.

In still another embodiment, the present invention provides a synthetic cracking catalyst produced in accordance with the method described hereinabove and consisting essentially of silica, alumina, and barium sulfate characterized by an apparent density of at least 0.9 gram per cubic centimeter and having 30 to 55 percent by weight of powdered barite of a weight mean particle diameter of 1 to 7 microns interdispersed in the structure of a silica-alumina cogel, in which the content of cogelled alumina is between about 5 and about 15 percent by weight.

Another embodiment of the invention resides in a process for catalytic cracking of hydrocarbon oils in the presence of the above catalyst in accordance with which a high conversion of the charge stock to useful products is realized.

The finely divided barite, employed in one of the reactants herein, chemically is barium sulfate. It is characterized by a rhombic crystalline structure, a density of about 4.5 grams/cc. and a melting point of approximately 1580° C. It is also known as barytes or heavy spar. It is essential in order to achieve the desired characteristics of high density, high diffusivity and high resistance to attrition that the particle size of the barite incorporated in the silica-alumina sol be within the approximate range of 1 to 7 microns in weight mean particle diameter. It is further essential in achieving the above desired catalyst characteristics that the amount of finely divided barite incorporated into the silica-alumina sol be within the approximate range of 30 to 55 percent by weight.

The acidic aluminum salt solution employed as another of the reactants herein may be any of the readily available water-soluble normal salts such as, for example, aluminum chloride, aluminum nitrate, aluminum sulfate, and the like. The acid contained in such solution is generally, but not necessarily, characterized by the same acid anion as the aluminum salt employed. Thus, an acidic aluminum salt solution of aluminum sulfate containing sulfuric acid has been found to afford highly satisfactory results in manufacture of the present catalyst. It is necessary that the equivalent ratio of hydrogen, derived from the acid, to aluminum, derived from the aluminum salt, be at least 0.21 in order to prevent flocculation of the finely divided barite in the hydrogel during the gelation period. It has been found that if the above equivalent ratio fell below 0.21, flocculation of the finely divided barite present in the hydrosol occurred leading to a heterogeneous, physically weak product, thereby defeating the objective of producing a highly attrition resistant catalyst. The above ratio can be readily controlled by the addition of a requisite amount of acid to the aluminum salt solution prior to contact of such solution with the other reactants.

The alkali metal silicate reactant employed in preparation of the present catalysts is generally sodium silicate but it is contemplated that other alkali metal silicates such as potassium silicate may, likewise, be used. The alkali metal oxide to silica weight ratio of the alkali metal silicate, for example, in sodium silicate the $Na_2O/SiO_2$ ratio is necessarily greater than 0.34 to prevent flocculation of the finely divided barite in the hydrosol during gelation. It has been found that if the above ratio fell below 0.34, flocculation of the finely divided barite present in the hydrosol occurred leading to a heterogeneous physically weak product, as noted hereinabove. The above ratio can be controlled by preparation of an alkali metal silicate in which the alkali metal oxide to silica weight ratio is above 0.34 or by the addition of the appropriate alkali metal hydroxide to a commercially available alkali metal silicate solution in which the above-noted ratio was below 0.34. For example, the $Na_2O/SiO_2$ weight ratio of commercial "N" brand sodium silicate solution normally 0.32 can be raised to above 0.34 by the addition thereto of sodium hydroxide. The concentration of alkali metal silicate solutions employed in the present process is generally such that the silica content thereof is between about 10 and about 30 percent by weight.

In accordance with the process of the invention, a silica-alumina hydrosol is prepared containing between about 30 and about 55 percent by weight based on the ultimately dried catalyst of powdered barite which has a weight mean particle diameter of between about 1 and about 7 microns. It has been found that the above particle size is an essential factor in imparting the desired attrition resistance to the prepared catalyst. The powdered material may be added by dispersing in an already prepared hydrosol or as is preferable, where the hydrosol is characterized by a short time of gelation, the powder may be added to one or more of the reactants used in forming the hydrosol or may be admixed in the form of a separate stream with streams of the hydrosol forming reactants in a mixing nozzle or other means where the reactants are brought into intimate contact.

The particle size distribution of the barite introduced into the silica-alumina hydrosol in accordance with the present process was determined by sedimentation methods. The weight mean particle diameters were determined by plotting the cumulative percent of barite smaller than a given diameter against particle diameter, dividing the total size range into a number of small fractions and calculating as follows:

$$\text{Weight mean diameter} = \frac{\sum d_i g_i}{\sum g_i}$$

where $d_i$ is the mean particle size of the fraction in microns and $g_i$ is the corresponding weight percent material in the fraction.

In addition to having the above-noted particle size, the barite incorporated in the hydrosol should necessarily be insoluble therein and should further be characterized by being infusible at the hydrogel drying temperature. The form of hydrogel is necessarily maintained substantially constant from a time prior to gelation until after the gel has been dried. During drying, the hydrogel undergoes considerable shrinkage. The drying is carried to a stage beyond that at which maximum shrinkage of the gel is obtained. The gel, after syneresis or shrinkage thereof has been completed, is substantially dry, that is the gel possesses open pores free of liquid although it still contains a relatively small percentage of water which is evolved upon subjecting the gel to a relatively high temperature. Hydrogel containing barite powder dispersed therein prepared in the present process may be dried at room temperatures or at higher temperatures in air or steam as well as in various inert or reducing atmospheres. While the prepared hydrogel may be dried at ambient temperature by merely exposing to the air, it is preferred to accelerate the removal of liquid content from the hydrogel by drying at a temperature in the range of about 150° F. to about 400° F. until shrinkage of the hydrogel is substantially complete. Drying may be carried out in air or superheated steam. To impart maximum attrition resistance to the gel, it is further preferred to subject the dried gel to calcination in an inert gas, air, steam or mixtures thereof at a temperature below that at which sintering is encountered and generally in the approximate range of 1150° F. to 1400° F. for a period of about 1 hour or more, generally from about 1 hour to about 24 hours. It is to be understood that the present process is applicable in imparting hardness characteristics to gels which have been dried to the point of maximum shrinkage and which may thereafter undergo the described further drying and/or calcining treatment. In every instance, at a comparable stage of drying or thermal treatment, the gel containing the powdered barite described herein was harder than a gel containing barite of larger particle size or gel prepared in the absence of added barite. Thus, the improvement in resistance to attrition is obtained both in the case of gels which had been merely dried and in the case of gels which had undergone calcination. The latter gels, however, exhibited optimum hardness and it is accordingly preferred to subject the gels prepared as described herein to a final calcination treatment.

The powder incorporated in the sol in accordance with the present invention, as previously noted, is chemically barium sulfate. It is essential that the powdered barite have a weight mean particle diameter in the range of 1 to 7 microns; that it be insoluble in the sol, i.e. that it maintain its powdered status upon dispersion in the sol and that it be infusible at the temperature of drying the hydrogel and at the temperature of calcination. The reason for the unusual hardness characteristics of the present gel catalyst is not known with certainty. It would appear however, that some cementation or hardening takes place during the setting and/or drying of the hydrogel containing the specified powdered barite.

The pH of the hydrosol containing finely divided dispersed barite must necessarily and essentially be precisely controlled within the relatively narrow range of 8 to 9 to achieve the advantages of the invention. If the pH is below 8, the resulting hydrogel is not responsive to subsequent hydrothermal treatment which step is desirably employed to retain the activity and to control the pore size of the finished catalyst. On the other hand, if the pH of the hydrosol exceeds 9, the resulting hydrogel upon subsequent hydrothermal treatment undergoes an exaggerated response resulting in a catalyst having low density and poor stability when employed in the cracking of hydrocarbon oils to lighter materials.

The product concentration (P.C.) of the hydrosol containing finely divided dispersed barite obtained in accordance with the process described herein is another variable which must be subject to close control in order to achieve the benefits of the invention. Product concentration, as utilized herein, refers to the total content of product solids present in the freshly formed hydrogel multiplied by 100 and divided by the sum of the total solids and water contained in the hydrogel. It is essential to the success of the present process that the product concentration (P.C.) of the hydrosol obtained be within the range of 10 to 20. With a product concentration of less than 10, the hydrogel is too weak to withstand mechanical handling, such as sluicing and washing during the course of manufacture. With a product concentration of more than 20, flocculation of the finely divided barite in the hydrosol occurs, leading to a heterogeneous physically weak product.

In order that the finished silica-alumina catalyst possess the requisite stability to deactivation by steam, it is essential that the cogelled alumina content of the initially formed hydrosol be at least about 5 percent by weight and preferably in the range of 5 to 15 percent by weight. In this regard, it was found that hydrosols having a content of cogelled alumina, i.e. alumina combined with silica in the hydrosol or hydrogel state, of less than about 5 percent by weight failed to possess the requisite steam stability. It is accordingly essential that the cogelled alumina content of the initially formed hydrosol be at least about 5 percent by weight. Since approximately 3 percent by weight of alumina is ordinarily introduced during the base exchange step by replacement of zeolitic alkali metal with aluminum, it will be appreciated that the cogelled alumina content of the hydrogel, after base exchange, is at least about 8 percent by weight.

The intermediate hydrogel state obtained in preparation of present catalysts is to be distinguished from a gelatinous precipitate. True all-embracing hydrogels occupy the entire volume of the solution from which they are formed and possess a definitely rigid structure. When fractured, a true hydrogel shows a conchoidal fracture as compared to an irregular ragged edge fracture as obtained in the case of gelatinous precipitates. The latter occupy only a part of the volume of the solution from which they are formed and have no rigidity of structure. In addition, hydrogels can generally be more easily washed free of soluble impurities due to the tendency of gelatinous precipitates to peptize on washing. A distinct and further advantage of hydrogels is that due to their rigid structure, they can be formed into high quality spheroidal particles.

The resulting silica-alumina hydrogel having finely divided barite dispersed therein is suitably subjected to a hydrothermal treatment which involves contacting the hydrogel with water for a specified period of time. It is desirable in obtaining a cracking catalyst of requisite activity that the hydrogel undergo hydrothermal treatment at a temperature within the approximate range of 70° F. to 200° F. for a period of between about 4 and about 24 hours, the time and temperature of the hydrothermal treatment being so correlated and controlled that the finished catalyst is characterized by an apparent density in the range of 0.90 and 1.20 grams per cubic centimeter.

The hydrogel is thereafter subjected to a base exchange treatment to remove zeolitic alkali metal introduced into the hydrogel through the use of an alkali metal silicate reactant. The hydrogel may be base-exchanged with a suitable aqueous solution containing an ion capable of replacing zeolitic alkali metal, which ion does not detrimentally affect the finished catalyst. Thus, the base-exchange solution employed may effect replacement of zeolitic alkali metal without involving the introduction of an additional metal or metal compound in the hydrogel, such as treatment with a solution of an aluminum salt, an ammonium salt or an acid. By using a base-exchange solution of a metal salt other than a metal already contained in the hydrogel, it is possible to introduce quantities of an additional metal oxide into the gel composite. The incorporation of such additional metal oxide into the hydrogel may desirably act as a catalytic promoter under particular reaction conditions. Under normal conditions of operation, however, it is contemplated that the base-exchange solution utilized herein will comprise an aqueous aluminum salt solution such as aluminum nitrate, aluminum chloride, aluminum sulfate and the like, enabling replacement of the zeolitic alkali metal in the hydrogel with aluminum during course of the base exchange operation.

The hydrogel product after base-exchange is water-washed free of soluble matter. The washed hydrogel is then dried, suitably in an atmosphere of superheated steam, at a temperature of about 150° F. to about 400° F. The dried product is thereafter calcined, suitably in an atmosphere of air and/or steam, at a temperature of 1150° F. to 1400° F. to yield a high density, highly attrition-resistant finished catalyst.

The process described herein may be employed in the preparation of a silica-alumina-barium sulfate cracking catalyst in any desired physical form. Thus, the hydrosol containing added barite powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also the hydrosol may be introduced into the perforations of a perforated plate and retained therein until the sol has set to a hydrogel after which the formed hydrogel pieces are removed from the plate. The method of the invention is especially useful as applied to the manufacture of spherically shaped gel particles produced by any feasible process such as that described in patents to Marisic, for example, U.S. 2,384,946. Broadly, such methods involve introducing globules of hydrosol into a column of water-immiscible liquid, for example, an oil medium wherein the globules of hydrosol set to spheroidal bead-like particles of hydrogel. Larger size spheres are ordinarily within the range of from about 1/64 to about 1/2 inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which spheroidal cracking catalyst particles are subjected to continuous movement. As applied to the stationary bed, spheroidal gel catalyst particles provided effective contact between the reactants and the catalyst by avoiding channeling.

It is accordingly a preferred embodiment of the present invention to prepare the described high density attrition-resistant silica-alumina catalyst in the form of spheres although it is to be realized that the method hereinafter set forth may also be employed in obtaining a mass of gel which may thereafter be broken up into particles of desired size. Likewise, the method described herein may be used in the preparation of the described silica-alumina-barium sulfate cracking catalysts in the form of particles of any other desired size or shape.

The cracking activity of the catalyst is a measure of its capacity to catalyze conversion of hydrocarbons and is expressed herein as the percentage conversion of a Mid-Continent gas oil having a boiling range of 450 to 950° F. to gasoline having an end point of 410° F. by passing vapors of the said gas oil through the catalyst at 875° F., substantially atmospheric pressure and a feed rate of 1.5 volumes of liquid oil per volume of catalyst per hour for ten minute runs between regenerations. The catalyst described herein is desirably characterized by a conversion, at equilibrium, determined on the above basis within the approximate range of 40 to 55.

The diffusivity of the catalyst is a measure of the ability of fluids to diffuse therethrough and is determined by measuring the rate at which hydrogen under a constant partial pressure, at essentially atmospheric conditions, will pass through a single catalyst particle having a size of 5 to 6 mesh (Tyler). The diffusivity is the average of such determinations on fifteen particles and is expressed as cubic centimeters of hydrogen per centimeter of catalyst per second $\times 10^{-3}$. The catalyst described herein is desirably characterized by a diffusivity determined on the above basis of at least 10 and generally within the range of 15 to 30.

The term "apparent density" as utilized herein refers to the weight as compared with the volume occupied by a packed mass of the catalyst particles. It is determined by weighing a fairly large volume of the catalyst particles. For example, a large diameter graduated cylinder is filled to a volume calibration gently tamped down and the weight of the particles determined by difference in weight of the graduate before and after filling with the particles. The catalyst of the present invention is characterized by an apparent density of at least 0.9 gram per cubic centimeter and generally within the range of 0.9 to 1.20 grams per cubic centimeter.

The attrition characteristics of the catalysts prepared in accordance with the method described herein were determined by an attrition test known as the Lauson Shaker Attrition (LSA) Test. The procedure used in the test consists of shaking a 50 cc. sample of the product to be tested in a closed steel cup which is bolted to the piston of a motor-driven Lauson engine which operated at 1000 r.p.m. After shaking for a time sufficient to produce 10 weight percent fines, capable of passing through an 8 mesh (Tyler) screen, the sample is screened, weighed and the percentage loss is calculated. These operations are repeated until slightly more than half the sample has been reduced to fines. Cumulative losses are plotted against total shaking time. The cumulative time in seconds for 50 percent weight of fines is read from the curve and is reported as the Lauson Shaker Attrition. Since the LSA of gels is affected by the size of the particles tested, the attrition data reported herein correspond to that of particles having an average particle diameter of 0.140 inch to avoid the interferences of these variables in correlating the effect of quantity and size of added material on attrition. The catalyst described herein is characterized by a LSA attrition resistance of at least 1000 seconds and generally within the approximate range of 1500 to 3000 seconds.

The following examples will serve to illustrate the present invention without limiting the same:

Example 1

Silica-alumina gel containing a small amount of chromia was prepared by mixing streams comprising:

(1) Sulfuric acid-aluminum sulfate containing a minor proportion of potassium chrome-alum,
(2) Sodium silicate solution,
(3) An aqueous slurry of finely divided barite.

The sulfuric acid-aluminum sulfate stream was composed of 2.65 percent by weight of sulfuric acid, 6.10 percent by weight of aluminum sulfate, 0.23 percent by weight of potassium chrome-alum and 91.02 percent by weight of water. The sodium silicate stream was composed of 35.45 weight percent of water and 62.08 percent by weight of N-Brand sodium silicate and 2.47 percent by weight sodium hydroxide. The barite slurry stream was composed of 26 percent by weight of barite having a weight mean particle diameter of 3.8 microns and 74 percent by weight of water. The sodium silicate stream and the barite slurry stream were initially combined to yield a mixture containing 40.05 percent by weight of N-Brand sodium silicate, 1.59 percent by weight sodium hydroxide, 9.23 percent by weight barite fines and 49.13 percent by weight water.

Three hundred eighty-three cc. per minute of the sulfuric acid-aluminum sulfate and 420 cc. per minute of the barite fines-sodium silicate solution were mixed in a mixing nozzle to form a sol which set to a hydrogel in 4.1 seconds at 48° F. The sol was formed into spheroidal hydrogel beads by introducing globules of the sol into an oil medium. The resulting hydrogel particles having a pH of 8.7 were treated for 8 hours at 79° F. while covered with water. The hydrogel particles were thereafter base-exchanged with a 1.5 percent by weight aluminum sulfate solution employing 9 two hour batch treatments to remove sodium from the structure of the gel. The hydrogel was thereafter treated with a 0.1 weight percent solution of ammonium sulfate employing two-1 hour batch treatments. The resulting hydrogel was washed free of soluble salts employing 0.01 volume of water per volume of hydrogel per minute. The washed hydrogel was dried in superheated steam at 280° F. for 6 hours and calcined for 3 hours at 1300° F. in air. The resulting gel, which contained 40.9 percent by weight of added barite, had a Lauson Shaker Attrition of 1900 seconds. The apparent density of the finished catalyst product was 1.13 g./cc. and the diffusivity thereof was 10.3. Gel of the same composition prepared similar to the above, with the exception that no finely divided barite was introduced into the sol showed an apparent density of 0.75 g./cc., a Lauson Shaker Attrition of 130 seconds and a diffusivity of 5.

The catalyst of the above example, as well as a comparable control catalyst containing no added finely divided barite were, after steaming for 10 hours at 1200° F., a pressure of 15 p.s.i.g. in 100 percent steam, employed in the cracking of a charge stock of Mid-Continent gas oil having a boiling range of 450 to 950° F. to gasoline having an end point of 410° F. by passing vapors of said gas oil through the catalyst at 875° F., substantially atmospheric pressure and a feed rate of 1.5 volumes of liquid oil per volume of catalyst per hour for ten minute runs between regenerations. The results of such test procedure are shown below, wherein the yields of gasoline, $C_4$'s, dry gas and coke were determined in each instance at a percent volume conversion of 51 percent:

|  | High Density Catalyst of Example 1 | Control Catalyst |
|---|---|---|
| Gasoline, Percent Vol | 37.1 | 36.3 |
| Total $C_4$, Percent Vol | 14.0 | 15.5 |
| Dry Gas, Percent Wt | 6.3 | 6.1 |
| Coke, Percent Wt | 3.6 | 3.4 |
| Gasoline/Coke Ratio | 10.3 | 10.7 |
| Conversion, Percent Vol | 51.0 | 51.0 |
| Hydrogen, Percent Wt | 0.04 | 0.02 |

It will be seen from the above data that at the same conversion level, the catalyst of the present invention possessed substantially the same catalytic cracking characteristics as the control catalyst in addition to being characterized by improved attrition resistance, higher diffusivity and a greater density than the control catalyst.

Example 2

Silica-alumina gel containing a small amount of chromia was prepared by mixing streams comprising:

(1) Sulfuric acid-aluminum sulfate containing a minor proportion of potassium chrome-alum,
(2) Sodium silicate solution,
(3) An aqueous slurry of finely divided barite.

The sulfuric acid-aluminum sulfate stream was composed of 2.65 percent by weight of sulfuric acid, 6.10 percent by weight of aluminum sulfate, 0.23 percent by weight of potassium chrome-alum and 91.02 percent by weight of water. The sodium silicate stream was composed of 35.45 weight percent of water and 62.08 percent by weight of N-Brand sodium silicate and 2.47 percent by weight sodium hydroxide. The barite slurry stream was composed of 26 percent by weight of barite having a weight mean particle diameter of 3.8 microns and 74 percent by weight of water. The sodium silicate stream and the barite slurry stream were initially combined to yield a mixture containing 40.05 percent by weight of N-Brand sodium silicate, 1.59 percent by weight sodium hydroxide, 9.23 percent by weight barite fines and 49.13 percent by weight water.

Three hundred eighty-three cc. per minute of the sulfuric acid-aluminum sulfate and 420 cc. per minute of the barite fines-sodium silicate solution were mixed in a mixing nozzle to form a sol which set to a hydrogel in 4.1 seconds at 48° F. The sol was formed into spheroidal hydrogel beads by introducing globules of the sol into an oil medium. The resulting hydrogel particles having a pH of 8.7 were treated for 8 hours at 115° F. while covered with water. The hydrogel particles were thereafter base-exchanged with a 1.5 percent by weight aluminum sulfate solution employing 9 two hour batch treatments to remove sodium from the structure of the gel. The hydrogel was thereafter treated with a 0.1 weight percent solution of ammonium sulfate employing two-1 hour batch treatments. The resulting hydrogel was washed free of soluble salts employing 0.01 volume of water per volume of hydrogel per minute. The washed hydrogel was dried in superheated steam at 280° F. for 6 hours and calcined for 3 hours at 1300° F. in air. The resulting gel, which contained 40.9 percent by weight of added barite, had a Lauson Shaker Attrition of 3000 seconds. The apparent density of the finished catalyst was 1.02 g./cc. and the diffusivity thereof was 11.0. Gel of the same composition prepared similar to the above, with the exception that no finely divided barite was introduced into the sol showed an apparent density of 0.75 g./cc., a Lauson Shaker Attrition, of 130 seconds and a diffusivity of 5.

A series of silica-alumina-barium sulfate catalysts utilizing the procedure of the foregoing example were prepared to illustrate the effect of variation in barite fines concentration and hydrothermal treatment on the physical properties of the resulting composites. These catalysts were formed at 8.7 pH, employing barite having a weight mean particle diameter of 3.7 microns. The cogelled alumina content of these composites was approximately 14.5 percent by weight. Results are shown in the table below:

| Example | 3 | 4 | 5 | 6 | 7 | 8 | 9 | 10 | 11 | 12 | 13 | 14 |
|---|---|---|---|---|---|---|---|---|---|---|---|---|
| Barite Fines Conc., Percent Wt | 40.9 | 40.9 | 40.9 | 42.9 | 42.9 | 42.9 | 44.8 | 44.8 | 44.8 | 46.8 | 46.8 | 46.8 |
| Hydrothermal Treatment, hrs./° F | 4/70 | 8/85 | 8/115 | 4/70 | 8/85 | 8/115 | 4/70 | 8/85 | 8/115 | 4/70 | 8/85 | 8/115 |
| Physical Properties of Finished Catalyst: | | | | | | | | | | | | |
| Apparent Density, g./cc | 1.14 | 1.11 | 1.02 | 1.15 | 1.11 | 1.03 | 1.16 | 1.15 | 1.07 | 1.14 | 1.12 | 1.07 |
| Lauson Shaker Attrition (seconds) | 4,000 | 4,000 | 3,200 | 1,200 | 2,800 | 3,100 | 1,900 | 2,000 | 2,900 | 500 | 500 | 800 |
| Diffusivity (cm.²/sec.) $10^3$ | 5.7 | 7.6 | 9.3 | 11.8 | 9.0 | 9.0 | 13.1 | 12.6 | 11.9 | 41.9 | 41.6 | 27.9 |

Catalytic hydrocarbon conversion, utilizing the catalyst described herein, may be carried out at catalytic cracking conditions employing a temperature within the approximate range of 700° F. to 1200° F. and under a pressure ranging from sub-atmospheric pressure up to several hundred atmospheres. The contact time of the oil with the catalyst is adjusted in any case according to the conditions, the particular oil feed and the particular results desired to give a substantial amount of cracking to lower boiling points.

We claim:

1. A method for preparing an attrition resistant catalyst consisting essentially of silica, alumina and barium sulfate characterized by a high diffusivity and an apparent density of at least 0.9 g./cc. which comprises dispersing in a silica-alumina sol containing, on a dry basis, a major proportion of silica and a minor proportion of between about 5 and about 15 percent by weight of alumina, an amount corresponding to between about 30 and about 55 percent by weight of the resulting dry composite of finely divided barite which has a weight mean particle diameter of between about 1 and about 7 microns, the concentrations and proportions of reactants being such that the resulting silica-alumina sol having the finely divided barite dispersed therein has a pH of between 8 and 9 and a product concentration of between 10 and 20, permitting the resulting sol to set to a hydrogel, washing the hydrogel free of water-soluble matter, drying and calcining.

2. A method for preparing an attrition resistant catalyst consisting essentially of silica, alumina and barium sulfate characterized by a high diffusivity and an apparent density of at least 0.9 g./cc. which comprises dispersing in a silica-alumina sol containing, on a dry basis, a major proportion of silica and a minor proportion of between about 5 and about 15 percent by weight of alumina, prepared by intimately contacting an aqueous acidic solution of a water-soluble aluminum salt in which the equivalent ratio of hydrogen to aluminum is at least 0.21 and an aqueous alkali metal silicate solution in which the weight ratio of alkali metal oxide to silica is at least 0.34, an amount corresponding to between about 30 and about 55 percent by weight of the resulting dry composite of finely divided barite which has a weight mean particle diameter of between about 1 and about 7 microns, the concentrations and proportions of reactants being such that the resulting silica-alumina sol having the finely divided barite dispersed therein has a pH of between 8 and 9 and a product concentration of between 10 and 20, permitting the resulting sol to set to a hydrogel, base-exchanging zeolitic alkali metal from the resulting hydrogel, washing the hydrogel free of water-soluble matter, drying and calcining.

3. A method for preparing an attrition resistant catalyst consisting essentially of silica, alumina and barium sulfate characterized by a high diffusivity and an apparent density of at least 0.9 g./cc. which comprises dispersing in a silica-alumina sol containing, on a dry basis, a major proportion of silica and a minor proportion of between about 5 and about 15 percent by weight of alumina prepared by intimately contacting an aqueous acidic solution of a water-soluble aluminum salt and an aqueous alkali metal silicate solution, an amount corresponding to between about 30 and about 55 percent by weight of the resulting dry composite of finely divided barite which has a weight mean particle diameter of between about 1 and about 7 mircons, the concentrations and proportions of reactants being such that the resulting silica-alumina sol having the finely divided barite dispersed therein has a pH of between 8 and 9 and a product concentration of between 10 and 20, permitting the resulting sol to set to a hydrogel, hydrothermally treating the resulting hydrogel at a temperature between 70° F. and 200° F. for 4 to 24 hours, base-exchanging zeolitic alkali metal from the treated hydrogel, washing the hydrogel free of water-soluble matter, drying and calcining.

4. A method for preparing an attrition resistant catalyst consisting essentially of silica, alumina and barium sulfate characterized by a high diffusivity and an apparent density of between 0.9 and 1.20 g./cc. which comprises dispersing in a silica-alumina sol containing, on a dry basis, a major proportion of silica and a minor proportion of between about 5 and about 15 percent by weight of alumina and prepared by intimately contacting an aqueous acidic solution of a water-soluble aluminum salt in which the equivalent ratio of hydrogen to aluminum is at least 0.21, an aqueous alkali metal silicate solution in which the weight ratio of alkali metal oxide to silica is at least 0.34 and an aqueous slurry of finely divided barite which has a weight mean particle diameter of between about 1 and about 7 microns present in an amount corresponding to between about 30 and about 55 percent by weight of the resulting dry composite under conditions such that the resulting silica-alumina hydrosol having the finely divided barite dispersed therein has a pH of between 8 and 9 and a product concentration of between 10 and 20, permitting the resulting sol to set to a hydrogel, hydrothermally treating the resulting hydrogel at a temperature between about 70° F. and about 200° F. for 4 to 24 hours, base-exchanging zeolitic alkali metal from the treated hydrogel, washing the hydrogel free of water-soluble matter, drying and calcining.

5. A method for preparing an attrition resistant catalyst consisting essentially of silica, alumina and barium sulfate characterized by a high diffusivity and an apparent density of at least 0.9 g./cc. which comprises dispersing in a silica-alumina sol containing, on a dry basis, a major proportion of silica and a minor proportion of between about 5 and about 15 percent by weight of alumina prepared by intimately contacting an aqueous acidic solution of a water-soluble aluminum salt in which the equivalent ratio of hydrogen to aluminum is at least 0.21 and an aqueous alkali metal silicate solution in which the weight ratio of alkali metal oxide to silica is at least 0.34, an amount corresponding to between about 30 and about 55 percent by weight of the resulting dry composite of finely divided barite, which has a weight mean particle diameter of between about 1 and about 7 microns, the concentrations and proportions of reactants being such that the resulting silica-alumina sol having the finely divided barite dispersed therein has a pH of between 8 and 9 and a product concentration of between 10 and 20, permitting the resulting sol to set to a hydrogel, hydrothermally treating the resulting hydrogel at a temperature of between 70° F. and 200° F. for 4 to 24 hours, base-exchanging zeolitic alkali metal from the hydrothermally treated hydrogel with aluminum to yield a product in which the alumina content is between about 8 and about 18 percent by weight, on a dry basis, washing the hydrogel free of water-soluble matter, and drying and calcining.

6. A method for preparing spheroidal particles of an attrition resistant catalyst consisting essentially of silica, alumina and barium sulfate characterized by a high diffusivity and an apparent density of at least 0.9 g./cc. which comprises dispersing in a silica-alumina sol containing, on a dry basis, a major proportion of silica and a minor proportion of between about 5 and about 15 percent by weight of alumina, an amount corresponding to between about 30 and about 55 percent by weight of the resulting dry composite of finely divided barite which has a weight mean particle diameter of between about 1 and about 7 microns, the concentrations and proportions of reactants being such that the resulting silica-alumina sol having the finely divided barite dispersed therein has a pH between 8 and 9 and a product concentration of between 10 and 20, introducing globules of the resulting hydrosol into a column of water-immiscible liquid wherein the globules of hydrosol set to spheroidal hydrogel, effecting gelation of said spheroidal hydrosol particles, washing the spheroidal hydrogel particles free of water-soluble matter and drying and calcining.

7. A method for preparing spheroidal particles of an attrition resistant catalyst consisting essentially of silica, alumina and barium sulfate characterized by a high diffusivity and an apparent density of at least 0.9 g./cc. which comprises dispersing in a silica-alumina sol containing, on a dry basis, a major proportion of silica and a minor proportion of between about 5 and about 15 percent by weight of alumina, an amount corresponding to between about 30 and about 55 percent by weight of the resulting dry composite of finely divided barite which has a weight mean particle diameter of between about 1 and about 7 microns, the concentrations and proportions of reactants being such that the resulting silica-alumina sol having the finely divided barite dispersed therein has a pH between 8 and 9 and a product concentration of between 10 and 20, introducing globules of the resulting sol into a column of water-immiscible liquid wherein the globules of hydrosol set to spheroidal hydrogel, effecting gelation of said spheroidal hydrosol particles, hydrothermally treating the resulting hydrogel particles at a temperature of between 70° F. and 200° F. for 4 to 24 hours, washing the spheroidal hydrogel particles free of water-soluble matter, and drying and calcining.

8. An attrition resistant catalyst composition consisting essentially of silica, alumina and barium sulfate characterized by a high diffusivity and an apparent density of at least 0.9 g./cc. prepared by dispersing in a silica-alumina sol containing, on a dry basis, a major proportion of silica and a minor proportion of between about 5 and about 15 percent by weight of alumina, an amount corresponding to between about 30 and about 55 percent by weight of the resulting dry composite of finely divided barite which has a weight mean particle diameter of between about 1 and about 7 microns, the concentrations and proportions of reactants being such that the resulting silica- alumina sol having the finely divided barite dispersed therein has a pH of between 8 and 9 and a product concentration of between 10 and 20, permitting the resulting sol to set to a hydrogel, washing the hydrogel free of water-soluble matter, drying and calcining.

9. An attrition resistant catalyst composition in the form of spheroids consisting essentially of silica, alumina and barium sulfate characterized by a high diffusivity and an apparent density of at least 0.9 g./cc. prepared by dispersing in a silica-alumina sol containing, on a dry basis, a major proportion of silica and a minor proportion between about 5 and about 15 percent by weight of alumina, an amount corresponding to between about 30 and about 55 percent of the resulting dry composite of finely divided barite which has a weight mean particle diameter of between about 1 and about 7 microns, the concentrations and proportions of reactants being such that the resulting silica-alumina sol having the finely divided barite dispersed therein has a pH between 8 and 9 and a product concentration of between 10 and 20, introducing globules of the resulting hydrosol into a column of water-immiscible liquid wherein the globules of hydrosol set to spheroidal hydrogel, effecting gelation of said spheroidal hydrosol particles, hydrothermally treating the resulting hydrogel particles at a temperature of between 70° F. and 200° F. for 4 to 24 hours, washing the spheroidal hydrogel particles free of water-soluble matter and drying and calcining.

10. A process for cracking a hydrocarbon charge which comprises contacting said charge under catalytic cracking conditions with an attrition resistant catalyst consisting essentially of silica, alumina and barium sulfate characterized by a high diffusivity and an apparent density of at least 0.9 g./cc., prepared by dispersing in a silica-alumina sol containing, on a dry basis, a major proportion of silica and a minor proportion of between about 5 and about 15 percent by weight of alumina, an amount corresponding to between about 30 and about 55 percent by weight of the resulting dry composite of finely divided barite which has a weight mean particle diameter of between about 1 and about 7 microns, the concentrations and proportions of reactants being such that the resulting silica-alumina sol having the finely divided barite dispersed therein has a pH of between 8 and 9 and a product concentration of between 10 and 20, permitting the resulting sol to set to a hydrogel, washing the hydrogel free of water-soluble matter, drying and calcining.

11. A process for cracking a hydrocarbon charge which comprises contacting said charge under catalytic cracking conditions with an attrition resistant catalyst consisting essentially of silica, alumina and barium sulfate characterized by a high diffusivity and an apparent density of at least 0.9 g./cc. prepared by dispersing in a silica-alumina sol containing, on a dry basis, a major proportion of silica and a minor proportion of between about 5 and about 15 percent by weight of alumina, prepared by intimately contacting an aqueous acidic solution of a water-soluble aluminum salt and an aqueous alkali metal silicate solution, an amount corresponding to between about 30 and about 55 percent by weight of the resulting dry composite of finely divided barite which has a weight mean particle diameter of between about 1 and about 7 microns, the concentrations and proportions of reactants being such that the resulting silica-alumina sol having the finely divided barite dispersed therein has a pH of between 8 and 9 and a product concentration of between 10 and 20, permitting the resulting sol to set to a hydrogel, base-exchanging zeolitic alkali metal from the resulting hydrogel, washing the hydrogel free of water-soluble matter, drying and calcining.

12. A process for cracking a hydrocarbon charge which comprises contacting said charge under catalytic cracking conditions with an attrition resistant spheroidal catalyst consisting essentially of silica, alumina and barium sulfate characterized by a high diffusivity and an apparent density of at least 0.9 g./cc. prepared by dispersing in a silica-alumina sol containing, on a dry basis, a major proportion of silica and a minor proportion of between about 5 and about 15 percent by weight of alumina, an amount corresponding to between about 30 and about 55 percent by weight of the resulting dry composite of finely divided barite which has a weight mean particle diameter of between about 1 and about 7 microns, the concentrations and proportions of reactants being such that the resulting silica-alumina sol having the finely divided barite dispersed therein has a pH between 8 and 9 and a product concentration of between 10 and 20, introducing globules of the resulting hydrosol into a column of water-immiscible liquid wherein the globules of hydrosol set to spheroidal hydrogel, effecting gelation of said spheroidal hydrosol particles, hydrothermally treating the resulting hydrogel particles at a temperature of between 70° F. and 200° F. for 4 to 24 hours, washing the spheroidal hydrogel particles free of water-soluble matter and drying and calcining.

References Cited in the file of this patent

UNITED STATES PATENTS

| | | |
|---|---|---|
| 2,945,910 | Peterson | July 19, 1960 |
| 2,951,815 | Cramer et al. | Sept. 6, 1960 |